(12) United States Patent
Kirchhoff et al.

(10) Patent No.: US 8,295,865 B1
(45) Date of Patent: *Oct. 23, 2012

(54) METHOD AND SYSTEMS FOR SHORT MESSAGE FORWARDING SERVICES

(75) Inventors: Leland W. Kirchhoff, Santa Barbara, CA (US); David C. McClintock, Santa Barbara, CA (US); David S. Trandal, Santa Barbara, CA (US)

(73) Assignee: Callwave Communications, LLC, Santa Barbara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/360,554

(22) Filed: Jan. 27, 2012

Related U.S. Application Data (63) Continuation of application No. 11/757,737, filed on Jun. 4, 2007, now Pat. No. 8,121,626.

(60) Provisional application No. 60/811,068, filed on Jun. 5, 2006.

(51) Int. Cl.
*H04W 4/00* (2009.01)

(52) U.S. Cl. ............... 455/466; 455/513; 455/412.1; 370/390

(58) Field of Classification Search .......... 455/466, 455/513, 412.1; 370/390
See application file for complete search history.

(56) References Cited

U.S. PATENT DOCUMENTS

| | | |
|---|---|---|
| 3,936,613 A | 2/1976 | Nishigori et al. |
| 3,956,595 A | 5/1976 | Sobanski |
| 4,009,337 A | 2/1977 | Sakai et al. |
| 4,022,983 A | 5/1977 | Braun et al. |
| 4,485,470 A | 11/1984 | Reali |
| 4,736,405 A | 4/1988 | Akiyama |
| 4,809,321 A | 2/1989 | Morganstein et al. |
| 4,893,336 A | 1/1990 | Wuthnow |
| 4,994,926 A | 2/1991 | Gordon et al. |
| 5,040,208 A | 8/1991 | Jolissaint |
| 5,046,087 A | 9/1991 | Sakai |
| 5,291,302 A | 3/1994 | Gordon et al. |
| 5,404,537 A | 4/1995 | Olnowich et al. |
| 5,434,908 A | 7/1995 | Klein |

(Continued)

FOREIGN PATENT DOCUMENTS

CA 1329852 9/1989

(Continued)

OTHER PUBLICATIONS

Article: "Widget MySpace Widget"; posted by 4INFO Bob; http://4info.typepad.com/blog/2006/09/widget_myspace_.html; Sep. 15, 2006; 3 pages.

(Continued)

*Primary Examiner* — Jinsong Hu
*Assistant Examiner* — Qun Shen
(74) *Attorney, Agent, or Firm* — Knobbe, Martens, Olson & Bear LLP (57) ABSTRACT

Methods and systems are described for processing visual messages, such as text or multimedia messages, originated from a mobile phone. In an embodiment, a visual message from an originating wireless telephonic device is directed to an original destination address associated with a user. An indication that the visual message has been received at a first telecommunications system, wherein an original destination associated with the original destination address is not available to receive the originating wireless telephonic device visual message. The visual message is wirelessly transmitted to an alternate destination.

21 Claims, 7 Drawing Sheets

U.S. PATENT DOCUMENTS

| | | |
|---|---|---|
| 5,459,584 A | 10/1995 | Gordon et al. |
| 5,467,388 A | 11/1995 | Redd, Jr. et al. |
| 5,526,524 A | 6/1996 | Madduri |
| 5,533,102 A | 7/1996 | Robinson et al. |
| 5,533,106 A | 7/1996 | Blumhardt |
| 5,577,111 A | 11/1996 | Iida et al. |
| 5,583,918 A | 12/1996 | Nakagawa |
| 5,619,557 A | 4/1997 | Van Berkum |
| 5,619,708 A | 4/1997 | Ho |
| 5,640,677 A | 6/1997 | Karlsson |
| 5,651,054 A | 7/1997 | Dunn et al. |
| 5,668,861 A | 9/1997 | Watts |
| 5,668,928 A | 9/1997 | Groner |
| 5,751,795 A | 5/1998 | Hassler et al. |
| 5,774,067 A | 6/1998 | Olnowich et al. |
| 5,805,587 A | 9/1998 | Norris et al. |
| 5,809,128 A | 9/1998 | McMullin |
| 5,812,551 A | 9/1998 | Tsukazoe et al. |
| 5,825,867 A | 10/1998 | Epler et al. |
| 5,832,060 A | 11/1998 | Corlett et al. |
| 5,835,573 A | 11/1998 | Dee et al. |
| 5,894,504 A | 4/1999 | Alfred et al. |
| 5,946,386 A | 8/1999 | Rogers et al. |
| 5,960,064 A | 9/1999 | Foladare et al. |
| 5,960,073 A | 9/1999 | Kikinis et al. |
| 5,963,629 A | 10/1999 | Jung |
| 5,995,594 A | 11/1999 | Shaffer et al. |
| 5,995,603 A | 11/1999 | Anderson |
| 6,014,436 A | 1/2000 | Florence et al. |
| 6,032,051 A | 2/2000 | Hall et al. |
| 6,034,956 A | 3/2000 | Olnowich et al. |
| 6,035,031 A | 3/2000 | Silverman |
| 6,044,059 A | 3/2000 | Olnowich |
| 6,078,581 A | 6/2000 | Shtivelman et al. |
| 6,104,800 A | 8/2000 | Benson |
| 6,144,644 A | 11/2000 | Bajzath et al. |
| 6,160,881 A | 12/2000 | Beyda et al. |
| 6,167,127 A | 12/2000 | Smith et al. |
| 6,169,795 B1 | 1/2001 | Dunn et al. |
| 6,169,796 B1 | 1/2001 | Bauer et al. |
| 6,175,622 B1 | 1/2001 | Chiniwala et al. |
| 6,178,183 B1 | 1/2001 | Buskirk, Jr. |
| 6,181,691 B1 | 1/2001 | Markgraf et al. |
| 6,208,638 B1 | 3/2001 | Rieley et al. |
| 6,212,261 B1 | 4/2001 | Meubus et al. |
| 6,230,009 B1 | 5/2001 | Holmes et al. |
| 6,233,318 B1 | 5/2001 | Picard et al. |
| 6,243,378 B1 | 6/2001 | Olnowich |
| 6,253,249 B1 | 6/2001 | Belzile |
| 6,278,704 B1 | 8/2001 | Creamer et al. |
| 6,304,565 B1 | 10/2001 | Ramamurthy |
| 6,310,939 B1 | 10/2001 | Varney |
| 6,350,066 B1 | 2/2002 | Bobo, II |
| 6,353,660 B1 | 3/2002 | Burger et al. |
| 6,353,663 B1 | 3/2002 | Stevens et al. |
| 6,363,414 B1 | 3/2002 | Nicholls et al. |
| 6,374,102 B1 | 4/2002 | Brachman et al. |
| 6,405,035 B1 | 6/2002 | Singh |
| 6,411,601 B1 | 6/2002 | Shaffer et al. |
| 6,411,805 B1 | 6/2002 | Becker et al. |
| 6,438,216 B1 | 8/2002 | Aktas |
| 6,438,222 B1 | 8/2002 | Burg |
| 6,477,246 B1 | 11/2002 | Dolan et al. |
| 6,496,569 B2 | 12/2002 | Pelletier et al. |
| 6,496,576 B2 | 12/2002 | Tanaka et al. |
| 6,501,750 B1 | 12/2002 | Shaffer et al. |
| 6,505,163 B1 | 1/2003 | Zhang et al. |
| 6,507,643 B1 | 1/2003 | Groner |
| 6,510,162 B1 | 1/2003 | Fijolek et al. |
| 6,510,417 B1 | 1/2003 | Woods et al. |
| 6,512,930 B2 | 1/2003 | Sandegren |
| 6,519,258 B1 | 2/2003 | Tsukazoe et al. |
| 6,535,585 B1 | 3/2003 | Hanson et al. |
| 6,539,084 B1 | 3/2003 | Long |
| 6,546,087 B2 | 4/2003 | Shaffer et al. |
| 6,549,612 B2 | 4/2003 | Gifford et al. |
| 6,553,222 B1 | 4/2003 | Weiss |
| 6,564,264 B1 | 5/2003 | Creswell et al. |
| 6,564,321 B2 | 5/2003 | Bobo, II |
| 6,567,505 B1 | 5/2003 | Omori et al. |
| 6,574,319 B2 | 6/2003 | Latter et al. |
| 6,621,892 B1 | 9/2003 | Banister et al. |
| 6,643,034 B1 | 11/2003 | Gordon et al. |
| 6,658,100 B1 | 12/2003 | Lund |
| 6,661,785 B1 | 12/2003 | Zhang et al. |
| 6,662,232 B1 | 12/2003 | Nicholls et al. |
| 6,690,785 B1 | 2/2004 | Stelter et al. |
| 6,751,299 B1 | 6/2004 | Brown et al. |
| 6,775,370 B2 | 8/2004 | Burg |
| 6,782,088 B1 | 8/2004 | Gabara |
| 6,785,021 B1 | 8/2004 | Gordon et al. |
| 6,792,094 B1 | 9/2004 | Kirkpatrick |
| 6,813,603 B1 | 11/2004 | Groner et al. |
| 6,857,074 B2 | 2/2005 | Bobo, II |
| 6,898,275 B2 | 5/2005 | Dolan et al. |
| 6,950,502 B1 | 9/2005 | Jenkins |
| 6,965,917 B1 | 11/2005 | Aloni et al. |
| 6,968,174 B1 | 11/2005 | Trandal et al. |
| 7,003,087 B2 | 2/2006 | Spencer et al. |
| 7,003,554 B1 | 2/2006 | Turner et al. |
| 7,027,567 B1 | 4/2006 | Scott et al. |
| 7,106,843 B1 | 9/2006 | Gainsboro et al. |
| 7,113,768 B2 * | 9/2006 | Hundscheidt et al. ...... 455/412.1 |
| 7,120,455 B1 * | 10/2006 | Chen et al. .................... 455/466 |
| 7,363,384 B2 | 4/2008 | Chatani et al. |
| 7,548,756 B2 | 6/2009 | Velthuis et al. |
| 7,738,479 B2 * | 6/2010 | Ruckart ....................... 370/444 |
| 7,826,605 B1 | 11/2010 | Vanier et al. |
| 7,903,795 B2 | 3/2011 | Hiatt et al. |
| 2001/0004741 A1 | 6/2001 | Sogo |
| 2002/0002704 A1 | 1/2002 | Davis et al. |
| 2002/0009184 A1 | 1/2002 | Shnier |
| 2002/0010616 A1 | 1/2002 | Itzhaki |
| 2002/0097710 A1 | 7/2002 | Burg |
| 2003/0039339 A1 | 2/2003 | Luehrig et al. |
| 2003/0063731 A1 | 4/2003 | Woodring |
| 2003/0066065 A1 | 4/2003 | Larkin |
| 2003/0123629 A1 | 7/2003 | Hussain et al. |
| 2003/0142807 A1 | 7/2003 | Dolan et al. |
| 2003/0156700 A1 | 8/2003 | Brown et al. |
| 2003/0167373 A1 | 9/2003 | Winters et al. |
| 2003/0191823 A1 * | 10/2003 | Bansal et al. ................ 709/220 |
| 2003/0220784 A1 | 11/2003 | Fellenstein et al. |
| 2004/0010786 A1 | 1/2004 | Cool et al. |
| 2004/0028203 A1 | 2/2004 | Wurster et al. |
| 2004/0143628 A1 | 7/2004 | Bradford et al. |
| 2004/0153538 A1 | 8/2004 | Champlin |
| 2004/0190703 A1 | 9/2004 | Trandal et al. |
| 2004/0190706 A1 | 9/2004 | Fleisher, III et al. |
| 2004/0237078 A1 | 11/2004 | Weiss et al. |
| 2004/0258220 A1 | 12/2004 | Levine et al. |
| 2005/0010573 A1 * | 1/2005 | Garg ............................... 707/10 |
| 2005/0044280 A1 | 2/2005 | Reisman |
| 2005/0053216 A1 | 3/2005 | Spencer et al. |
| 2005/0078612 A1 * | 4/2005 | Lang ............................ 370/260 |
| 2005/0119019 A1 * | 6/2005 | Jang ............................ 455/466 |
| 2005/0123118 A1 | 6/2005 | Terry et al. |
| 2005/0129206 A1 | 6/2005 | Martin |
| 2005/0136955 A1 | 6/2005 | Mumick et al. |
| 2005/0143106 A1 * | 6/2005 | Chan et al. ................... 455/466 |
| 2005/0154599 A1 | 7/2005 | Kopra et al. |
| 2005/0166246 A1 | 7/2005 | Calmels et al. |
| 2005/0198389 A1 * | 9/2005 | LaSalle et al. ................ 709/246 |
| 2005/0207556 A1 | 9/2005 | Gonzalez et al. |
| 2005/0210459 A1 | 9/2005 | Henderson et al. |
| 2005/0265322 A1 | 12/2005 | Hester |
| 2005/0286498 A1 | 12/2005 | Rand et al. |
| 2005/0287993 A1 * | 12/2005 | Gogic ........................... 455/413 |
| 2006/0013374 A1 | 1/2006 | Fleisher, III et al. |
| 2006/0063541 A1 * | 3/2006 | Ryu .............................. 455/466 |
| 2006/0080656 A1 | 4/2006 | Cain et al. |
| 2006/0130045 A1 | 6/2006 | Wesley et al. |
| 2006/0223502 A1 | 10/2006 | Doulton |
| 2006/0234680 A1 | 10/2006 | Doulton |
| 2006/0268007 A1 | 11/2006 | Gopalakrishnan |
| 2007/0002077 A1 | 1/2007 | Gopalakrishnan |
| 2007/0054678 A1 | 3/2007 | Doulton |

| | | | |
|---|---|---|---|
| 2007/0067738 A1 | 3/2007 | Flynt et al. | |
| 2007/0116194 A1 | 5/2007 | Agapi et al. | |
| 2007/0116204 A1 | 5/2007 | Doulton | |
| 2007/0117543 A1 | 5/2007 | Doulton | |
| 2007/0117544 A1 | 5/2007 | Doulton | |
| 2007/0117545 A1 | 5/2007 | Doulton | |
| 2007/0117546 A1 | 5/2007 | Doulton | |
| 2007/0117547 A1 | 5/2007 | Doulton | |
| 2007/0123280 A1* | 5/2007 | McGary et al. | 455/466 |
| 2007/0127638 A1 | 6/2007 | Doulton | |
| 2007/0127688 A1 | 6/2007 | Doulton | |
| 2007/0178919 A1* | 8/2007 | Huggett et al. | 455/466 |
| 2007/0202898 A1 | 8/2007 | Bae et al. | |
| 2007/0233795 A1* | 10/2007 | Setlow et al. | 709/206 |
| 2007/0274465 A1 | 11/2007 | Othmer | |
| 2008/0280644 A1* | 11/2008 | Hugot | 455/556.2 |
| 2009/0239504 A1* | 9/2009 | Turk | 455/412.1 |

FOREIGN PATENT DOCUMENTS

| | | |
|---|---|---|
| EP | 0 509 945 A2 | 10/1992 |
| EP | 1 120 954 | 8/2001 |
| EP | 1 213 647 A1 | 6/2002 |
| EP | 1 282 036 A2 | 2/2003 |
| JP | 10-513632 | 12/1998 |
| JP | 11-506292 | 6/1999 |
| JP | 2001-168989 | 6/2001 |
| WO | WO 96/18948 | 6/1996 |
| WO | WO 97/26749 | 7/1997 |
| WO | WO 00 60840 | 10/2000 |
| WO | WO 01/76210 | 10/2001 |
| WO | WO 03/063533 A2 | 7/2003 |

OTHER PUBLICATIONS

Article: Communications-SMS, Dashboard Widgets—Showcase; http://www.dashboardwidgets.com/showcase/details.php?wid=1082; Oct. 14, 2005; 2 pages.

Johnson, Dave; Article; "Now You're Talking—voice—response systems for home offices—Product Information"; http://www.findarticles.com; Feb. 1999.

Microsoft® Windows® Server Technical Article; "*Background Intelligent Transfer Service*," Microsoft Corporation, Published Aug. 2002, pp. 1-18.

\* cited by examiner

Send A Text Message

To: [Do|  ▼]   Address: [  ▼]

Subject: [John Doe]
[Jane Doe]   [4/24/06 11:14 am]

Message: [                    ]

[✓] Attach voice message

[Send]

METHOD AND SYSTEMS FOR SHORT MESSAGE FORWARDING SERVICES

CROSS-REFERENCE TO RELATED APPLICATIONS

This is a continuation of U.S. patent application Ser. No. 11/757,737, filed Jun. 4, 2007, which claims priority from U.S. Patent Application No. 60/811,068, filed Jun. 5, 2006, the contents of which are incorporated herein by reference in its entirety.

STATEMENT REGARDING FEDERALLY SPONSORED R&D

Not applicable.

PARTIES OF JOINT RESEARCH AGREEMENT

Not applicable.

REFERENCE TO SEQUENCE LISTING, TABLE, OR COMPUTER PROGRAM LISTING

Not applicable.

BACKGROUND OF THE INVENTION

1. Field of the Invention

The present invention relates generally to telecommunications and messaging and in particular, to systems and methods for handling messages over a wireless network.

2. Description of the Related Art

In conventional wireless networks, users generally have the ability to send and receive text messages between other wireless users or other hand held devices. This service is referred to as a Short Messaging Service.

For example, conventionally messages are sent from a mobile user via a store-and-forward mechanism to a Short Message Service Center (SMSC), which will attempt to send the message to the recipient and possibly retry sending the message if the user mobile device is not reachable at a given moment. However, conventionally, message delivery is on a best efforts basis. Thus, message delivery to a designated recipient is not guaranteed, and delay or complete loss of a message is not uncommon, particularly when sending SMS messages between network operators.

SUMMARY OF THE INVENTION

Example methods and systems are described that can be utilized to wirelessly forward a message (e.g., an SMS or MMS message) to a destination, such as a destination other than the originally addressed destination. For example, a forward operation may be triggered when a certain condition is detected, such as when the original destination (e.g., a mobile phone), is not available to receive the message. Certain embodiments further forward or broadcast a message (e.g., an SMS or MMS message) to a plurality of destinations, even if the message is addressed to a single destination. Certain embodiments store a message intended for an unavailable destination, such as a mobile phone, and when the destination becomes available, transmits the stored message to the destination.

An example embodiment provides a method of communicating a Short Messaging Service message from an originating device directed to an original destination address associated with a user, the method comprising: receiving at an SMS relay an indication that an SMS message has been received, the indication including the original destination address, wherein an original destination associated with the original destination address is not available to receive the SMS message; storing the SMS message on a networked server; and transmitting to a telecommunications client and/or an email address associated with the user an indication that an SMS message has been received.

An example embodiment provides a method of communicating a mobile phone message from an originating wireless mobile telephonic device directed to an original destination address associated with a user, wherein the mobile telephonic device message is a text message or multimedia message, the method comprising: receiving at a first telecommunications system an indication that a mobile telephonic device message has been received, the message including the original destination address, wherein an original destination associated with the original destination address is not available to receive the mobile telephonic device message; and transmitting to a telecommunications client and/or an email address associated with the user an indication that a mobile telephonic device message has been received.

An example embodiment provides a method of communicating a visual message from an originating device directed to an original destination phone address associated with a user, the method comprising: receiving at a first telecommunications system an indication that the visual message has been received, wherein an original destination associated with the original destination phone address is not available to receive the originating visual message; and transmitting the visual message to an alternate destination specified by the user.

BRIEF DESCRIPTION OF THE DRAWINGS

Embodiments of the present invention will now be described with reference to the drawings summarized below. These drawings and the associated description are provided to illustrate example embodiments of the invention, and not to limit the scope of the invention.

DETAILED DESCRIPTION OF PREFERRED EMBODIMENTS

Embodiments herein relate to telecommunications and messaging, and, for example, to methods and systems for providing messaging services, such as Short Message forwarding services or Multimedia Message forwarding services.

By way of example, methods and systems are described that wirelessly forward a message (e.g., an SMS or MMS message) to a destination other than the addressed destination and/or that forward or broadcast a message (e.g., an SMS or MMS message) to a plurality of destinations, even if the message is addressed to a single destination.

In an example embodiment, a Short Message Forwarding service (or other visual message forwarding service that handles messages intended to be viewed or read) provides additional value to wireless network customers or to other customers that communicate using SMS (or other visual message service) by enabling them to receive a forwarded Short Message (or other visual message) at another destination or device when the originally messaged destination (e.g., a mobile cellular phone, personal digital assistant, other SMS-capable mobile device, or other SMS device) is not accessible, e.g., is off or is out of range. Optionally, using message forwarding, the Short Message may still be delivered to the originally messaged destination when it is again accessible. Because the message is forwarded, the message may reach the destination device and the designated recipient in a more timely fashion.

Certain example methods and systems described herein enable a user to receive a message (e.g., a Short Message Service text message, a Multimedia Message Service multimedia message, etc.) at a location other the original designated destination (e.g., at a location other than a user's mobile device to which a Short Message Service text message is addressed), optionally while also receiving the message at the original designated location. In contrast to many conventional user interfaces, certain embodiments of the Short Message-related processes and apparatus disclosed herein take advantage of a telecommunications client hosted on a user terminal and connected to the telephone network (e.g., the public switched telephone network (PSTN), a wireless network, etc.) over the Internet.

In an example embodiment, the customer may configure one or more SMS/MMS and email forwarding addresses. Optionally, a message is sent to each address when a Short Message or Multimedia Message is received by an SMSC or a softswitch, as described below.

For example, optionally, a Short Message (SM) and/or email will automatically be forwarded to a telecommunications client as a default, but the subscriber can specify (e.g., via an account set-up/members zone Web page, via a Web site of a corresponding carrier partner, or via a telecommunications client, wherein the specification is stored in computer readable memory such as a database) that the SM be forwarded to other destinations instead of or in addition to the client. Optionally, an SM will not be forwarded to the telecommunications client unless the subscriber so specifies in the subscriber's account setup.

In an example embodiment, an underlying wireless carrier providing the Short Message Service and/or a Multimedia Message Service is equipped with a database, such as a Home Location Register (HLR), that contains information (e.g., a mobile device identifier, a mobile device telephone number, call/message forwarding information, location updates, and/or an indication as to whether the mobile device is roaming, with a mobile device is registered, etc.) regarding wireless subscribers and their mobile device(s), and a system for storing a message and transmitting that message to its destination, such as a Short Message Service Center (SMSC) and/or a Multimedia Service Center (MMSC), configured and enhanced to support Short Message Forwarding and Multimedia Message Forwarding as described herein.

Throughout the following description, the term "Web site" or "Web" is used to refer to a user-accessible network site that implements the basic World Wide Web standards for the coding and transmission of hypertextual documents. These standards currently include HTML (the Hypertext Markup Language) and HTTP (the Hypertext Transfer Protocol). It should be understood that the term "site" is not intended to imply a single geographic location, as a Web or other network site can, for example, include multiple geographically distributed computer systems that are appropriately linked together. Furthermore, while the following description relates to an embodiment utilizing the Internet and related protocols, other networks, such as networked interactive televisions, and other protocols may be used as well.

In addition, throughout the following description, the terms message, messaging, and Short Message are used to refer to text messages as well as to mixed media messages including but not limited to text or other visual messages (e.g., including Instant Messages), MMS, voice, fax, HTML, photos, video, music, program code, etc. Message content can be embedded in the body of the message, included as an attachment (e.g., a text file or voice attachment), or referenced or linked (e.g., by use of an embedded URL).

Further, while the following description refers to example network, messaging (e.g., SMS), and telephony standards and protocols (e.g., SS7, wireless protocols, etc.), other standards and protocols can be used as well. In addition, while references may be made to electronic address books or contact lists, other data stores and formats can be used to store contact information. In addition, unless otherwise indicated, the functions described herein may be performed by executable program code and instructions stored in computer readable memory and running on one or more processor-based systems. However, state machines, and/or hardwired electronic circuits can also be utilized. Further, with respect to the example processes described herein, not all the process states need to be reached, nor do the states have to be performed in the illustrated order. Further, certain process states that are illustrated as being serially performed can be performed in parallel.

Similarly, while certain examples may refer to a personal computer system or data device, other computer or electronic systems can be used as well, such as, without limitation, an interactive television, a networked-enabled personal digital assistant (PDA), a networked game console, a networked entertainment device, and so on. While certain references are made to certain example system components or services, other components and services can be used as well. In addition, while certain user inputs are described as being provided via phone key presses or by clicking on a button, optionally, user inputs can be provides using other techniques, such as by voice or otherwise. While certain phone numbers are referenced for purposes of illustration, other phone numbers or electronic addresses or locators can be used as well.

The term phone address can include a SIP address, a Skype address (or other peer-to-peer Internet telephony network address), a wireless phone number, an International number, an E.164 phone number, or other address. While Skype is referred to herein, other peer-to-peer telephony networks (e.g., having a decentralized and distributed user directory distributed among the nodes in the peer-to-peer telephony network) may be used as well to receive calls, place calls, and/or transfer calls. While certain phone addresses are referenced for purposes of illustration, other electronic addresses or locators can be used as well. While a SIP federated phone may be referred to, other data phones, such as an XMPP federation phone, a Skype phone (or other phone that communicates via a peer-to-peer telephony network), or other networked phone, which may be in the form of a softphone, may be used.

The term mobile device can include a telephone, such as a cellular mobile device compatible with CDMA, GSM, HSDPA, UMB, WiMax, and/or other standards.

Figure 3:
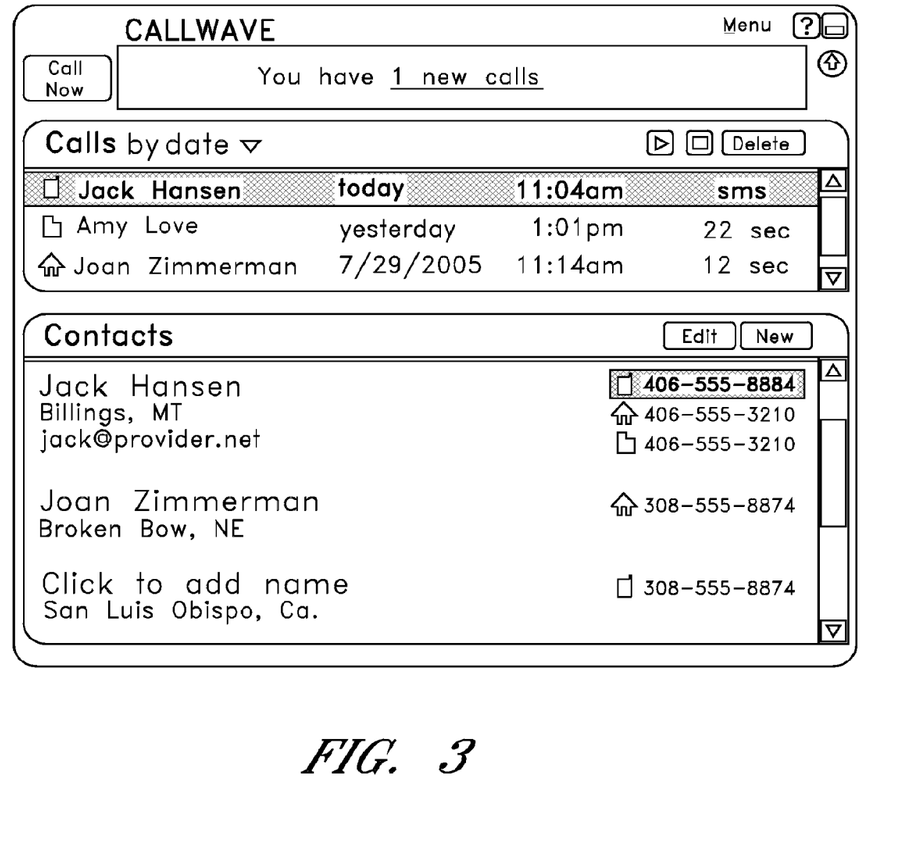
FIG. 3 illustrates a first example telecommunications client call log and user contacts user interface with text reply and forward.

In addition, certain call management capabilities described herein make use of a telecommunications client (e.g., a personal computer client, a client hosted on an interactive television, a network personal digital assistant, a smart phone, or a wireless phone with an Internet connection, etc.) to give the customer access to and management of calls (e.g., see example user interface illustrated in FIG. 3). Optionally, a customer can have multiple clients hosted on multiple computers or other hosts.

In an example embodiment, the telecommunications client application connects to and communicates with a system (e.g., a softswitch) via the Internet, an intranet, and/or other network. The client application, executing on a subscriber's computer terminal or other host, can make the subscriber's online presence known to the softswitch (e.g., by transmitting a message over the Internet to the softswitch). The client can be used to receive, edit, and display call log data from the softswitch (e.g., a list of calls placed to/received by the subscriber, or placed by the subscriber, including phone numbers, caller or called party names, date/time of the call, an indication as to whether a call was an outbound/inbound call, the city/state of the caller/called party, type of call voice, text, or fax, etc.), and call alert data (e.g., for an active call, listing the caller phone number, name, city/state, and/or call status (e.g., ringing, playing greeting, recording caller message, terminating call, displaying fax)). Optionally, the call alert also plays an audible signal, such as a ring tone.

The client application can display a log of recorded or received messages from callers, and can provide playback controls (e.g., play, fast forward, rewind) for playing back or displaying the recorded message (e.g., a voice message, a video message, a fax message, a text message, etc.) via the client computer terminal. The client optionally can also be used to screen calls (e.g., wherein the softswitch streams a message being left by a caller and stored in memory to the client so that the called party can listen to the message in substantially real time) and to instruct the softswitch to accept calls on the host computer terminal, forward calls, refuse calls, initiate call conferencing, and to otherwise provide call handling instructions. Optionally, the client application can be automatically and/or manually (e.g., directly in response to a user instruction) upgraded to a newer or different version over a data network, such as the Internet. For example, a system, such as an upgrade manager system (e.g., as part of the call processing system or independent of the call processing system), can provide client application downloads to users based on the current version being used by the users (e.g., are they using versions older than an available upgrade) and/or a level of authorization associated with users (e.g., is the user entitled to an upgrade). The upgrade manager system can download the application to the application host terminal in burst mode and/or in a trickle, background mode.

Figure 4:
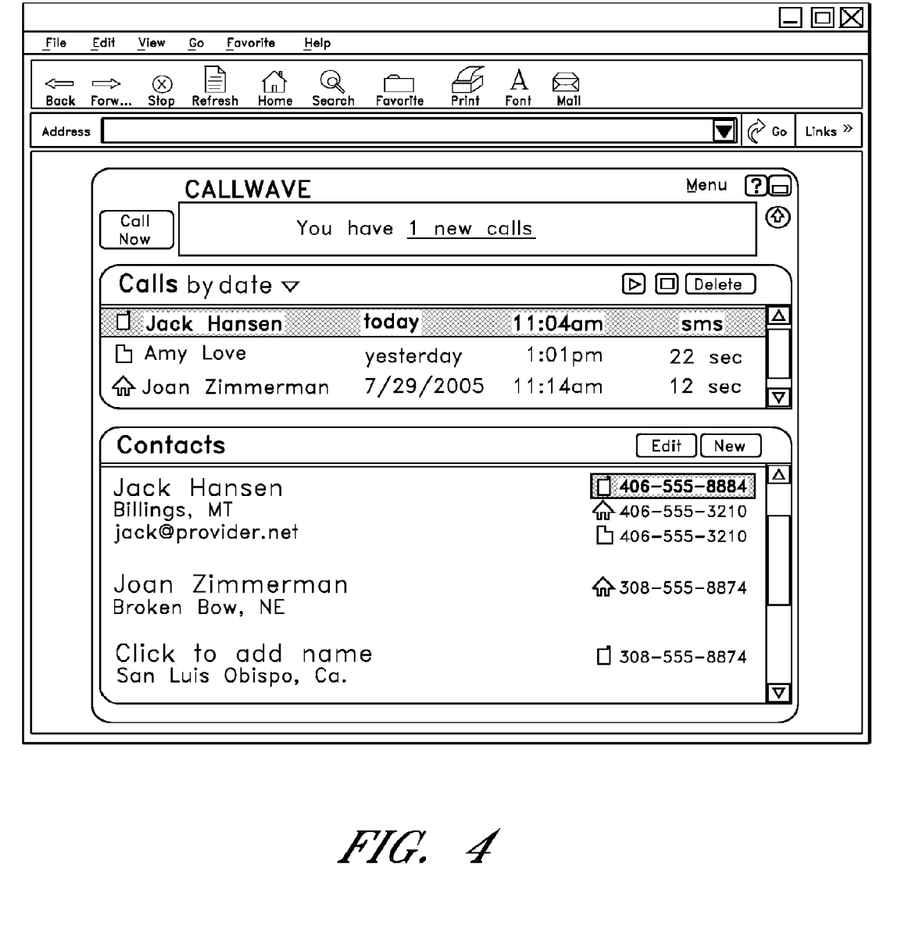
FIG. 4 illustrates an example user interface of a call log via a web browser.

The telecommunications client is an example user interface and other user interfaces can be used in addition or instead. FIG. 4 illustrates another example call log user interface presented via a browser to a customer. The browser can be executing on a computer terminal, such as a personal computer, a smart phone, a browser/Wireless Application Protocol (WAP)-enabled phone, a PDA, or the like. The call log can be accessed by supplying the appropriate URL to the browser and optionally providing log-on information, such as a user name and a password.

Enhanced service providers, such as CallWave, have emerged, providing new features and functions on ordinary phone calls. By way of example, CallWave provides call screening and transfer features that enhance the customer's calling experience, such as those described in U.S. Pat. No. 7,103,167, the contents of which are incorporated herein in their entirety by reference. Other embodiments of Short Message service applications are described in U.S. Pat. No. 6,879, 677 issued Apr. 12, 2005, the contents of which are incorporated herein in their entirety by reference.

Other embodiments of related call management functions—call logging, caller name, call screening, fixed-mobile converged routing, privacy management, and bridged outcall—some or all of which can be applied in offering this service, are described in the following patent applications, the contents of which are incorporated by reference in their entirety:

U.S. patent application Ser. No. 11/366,989, filed Mar. 2, 2006, entitled "Methods and Systems for Creating a Dynamic Call Log and Contact Records";

U.S. Provisional patent application, 60/781,894, filed Mar. 13, 2006, entitled "Methods and Systems for Personalizing Calling/Caller Name";

U.S. patent application Ser. No. 11/374,390, filed Mar. 13, 2006, entitled "Systems and Methods for Call Screening";

U.S. patent application Ser. No. 11/040,185, entitled "Methods and Systems for Transferring Data Over a Network";

U.S. Provisional patent application Ser. No. 11/676,933, filed Feb. 20, 2007, entitled "Methods and Systems for Telephony Call Processing".

The functionality, operation, and implementation for an example Short Message Forwarding service will now be described in detail.

Glossary

Figure 1:
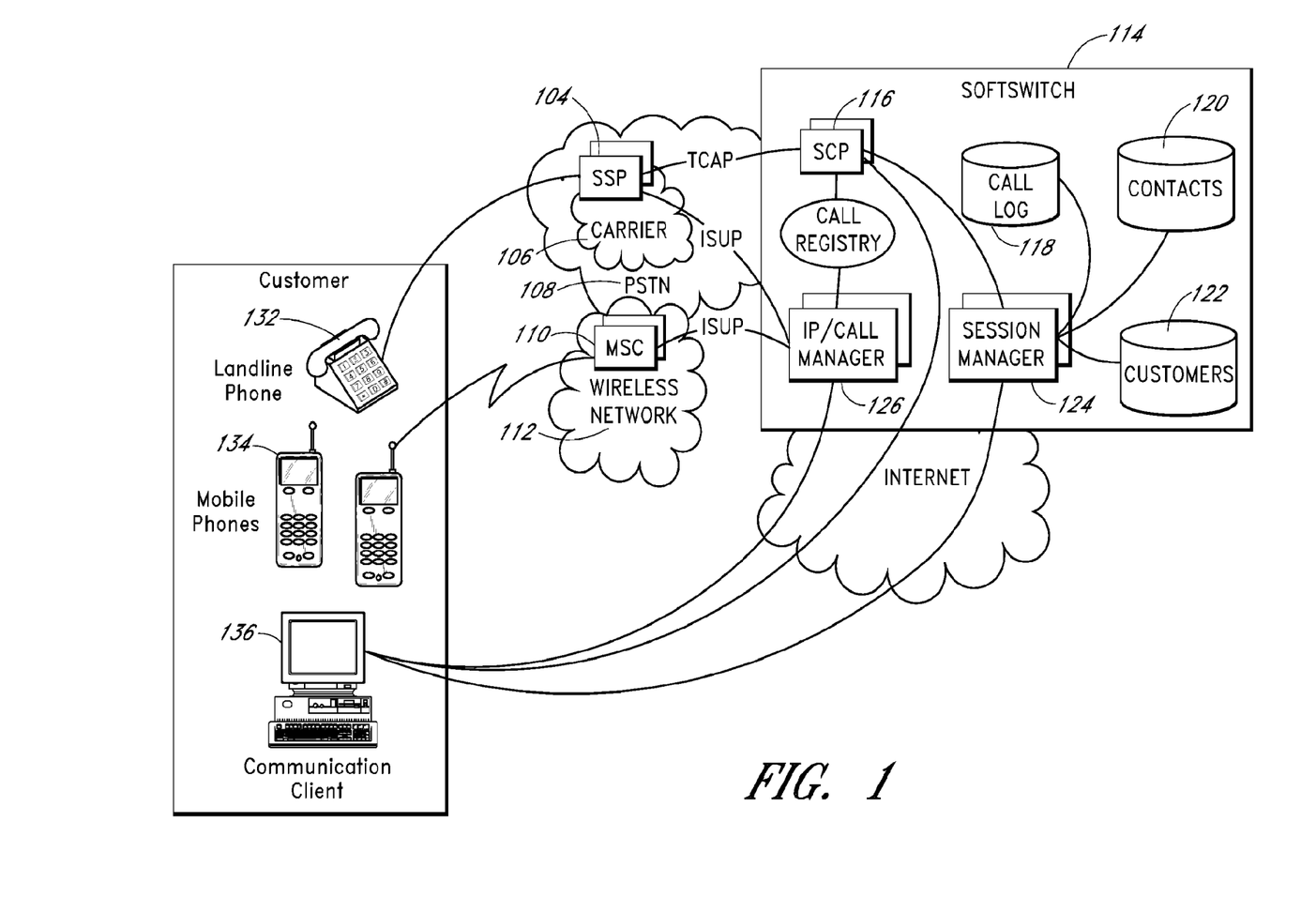
FIG. 1 illustrates an example network operating environment for advanced telecommunications services.

AIN—Advanced Intelligent Network
CP—Carrier Partner
IP—Intelligent Peripheral
MSC—Mobile Switching Center
MVNO—Mobile Virtual Network Operator
SCP—Service Control Point
SM—Short Message
SMS—Short Message Service
SMSC—Short Message Service Center
SMPP—Short Message Peer to Peer Protocol
SS7—Signaling System 7
SSP—Service Switching Point
TCAP—Transaction Capabilities Application Part FIG. 1 illustrates an example advanced telecommunications network environment.

A carrier (e.g., a Carrier Partner who is a partner or has an arrangement with a third party call processing operator in providing enhanced call processing services) customer has one or more landline phones that connect to an SSP 104 (Service Switching Point) in the carrier's network 106. The user/customer may also have one or more mobile phones 134 and one or more hosts (e.g., personal computers, smart phones, interactive televisions, networked game consoles, etc.) executing a telecommunications client 136. The telecommunications client 136 has one or more user interfaces that optionally display some or all of the following: a call log(including a log of SMS or other visual message), a contact record/list, and active, in-progress calls, and speed dial assignments.

Optionally, the customer can elect to screen or take an active call via the client 136 (e.g., where the customer hears the caller recording a message by the softswitch via a half-duplex streaming of the message to the client 136, but where the caller cannot hear the customer). Optionally, calls can also be made via the telecommunications client 136 (e.g., where the host is equipped with a speaker and microphone). Optionally, the telecommunications client 136 also displays text messages, such as SMS or instant messages.

Some or all of the foregoing client capabilities can optionally be provided via one or more web pages, widgets, gadgets, or other user interfaces. Further, optionally a subscriber can configure certain aspects of their account, such as forwarding rules (e.g., SMS, MMS, and/or other message forwarding rules), speed dial assignments, ringback signal assignments, busy signal assignments, call routing priorities and/or other instructions, via the telecommunications client 136, an account configuration/set-up web page (e.g., hosted by the softswitch 114), a widget, a gadget, or otherwise.

In this example, the softswitch 114 has one or more components, some of which are optionally centralized at a given location, others of which may be co-located in the carrier's network (e.g., to reduce network transport costs). The SCP 116 (Service Control Point) is an AIN component that interacts with one or more SSPs 104 (e.g., using the TCAP protocol). AIN triggers are optionally armed for the customer's landline phone number/address/account so that when calls are made to or from the landline phone 132 (e.g., a POTS landline phone that communicates via a switched circuit network such as the PSTN 108), a trigger fires and causes the SSP 104 to query the SCP 116 for instructions on how to handle the call. The SCP 116 is optionally also configured to perform TCAP queries to other SS7 components as needed by some services (e.g., request Automatic Callback from another carrier's switch when a line becomes idle) or to provision certain features.

Optionally, SS7 Wireless Intelligent Network (WIN) triggers and features are set in the mobile switches of Wireless Carrier Partners to provide similar calling services but for a customer's mobile phone number/address/account.

The softswitch 114 also optionally contains one or more systems 126, referred to herein as call managers. The call managers 126 are connected to the PSTN 108 (e.g., via ISDN using the ISUP (ISDN User Part) protocol, by way of example). The call managers 126 service or provide some or all of the following: provide a call screening service when screening is to be provided, record a message from a caller that is to be recorded, provide a voice prompt or message that is to be played to a caller and/or called party, record a facsimile document that needs to be recorded in a database, detect speech or DTMF tones, convert speech that needs to be converted to text, and/or provide an inbound/outbound gateway between the SS7 network and SIP networks. The example call manager 126 optionally can also act as an IP (Intelligent Peripheral), another AIN component that the SCP 116 can instruct the SSP 104 to connect into the call for interaction with the called and calling party. The IP/call managers 126 and SCPs 116 in the softswitch 114 optionally share a Call Registry that stores information about active calls.

The session managers 126 in the softswitch 114 track telecommunication client 136 presence and interact with a given telecommunications client 136 (e.g., a personal computer client) as call log, contact, and/or customer data need to be synchronized with centralized databases to provide the customer, via the client 136, with updated log, contact, and/or customer data. The session managers 126 also optionally provide the SCP 116 with service configuration information for the customer involved in a call. During an active call, the SCP 116 and/or IP/call manager 126 optionally directly interact with the telecommunications client 136 to provide call progress information, and to stream audio to the client 126.

The softswitch 114 in this example contains centralized databases and/or general-purpose storage areas, optionally including, but not limited to, some or all of the following: a call log database 118, a contacts database 120, and a customer database 122. The call log database 118 stores call events and related data for incoming and outgoing calls. The contacts database 120 stores information and parameters (e.g., names, identifiers, and/or phone numbers/addresses, etc.) associated with a called or calling party. The customer database 122 stores information and parameters (e.g., account data and configuration information) associated with subscribers/customers.

The softswitch call processing system 114 optionally includes one or more other subsystems, such as some or all of the following: a router subsystem, which serves as an interface to the Internet to manage communications between online IP client devices and one or more call processing servers, a web server subsystem to manage a "website" associated with the softswitch 114 (e.g., via which a user can access an account set-up/configuration user interface, a speed dial assignment user interface, a call log 118, a contacts database 120, etc., using a browser or other network user interface), etc. These foregoing subsystems are optionally interconnected via a Local Area Network (LAN), a Wide Area Private Network (WAN), and/or a Wide Area Public Network (e.g., Internet).

The call manager 126 can communicate with the mobile phones 134 across the PSTN 108 over a wireless network 112 via the corresponding MSC 110. The softswitch 114 (e.g., via the call manager 126 and session manager 124) can communicate over the Internet 128 with the telecommunications client 136, browsers, widgets, etc.

Figure 2:
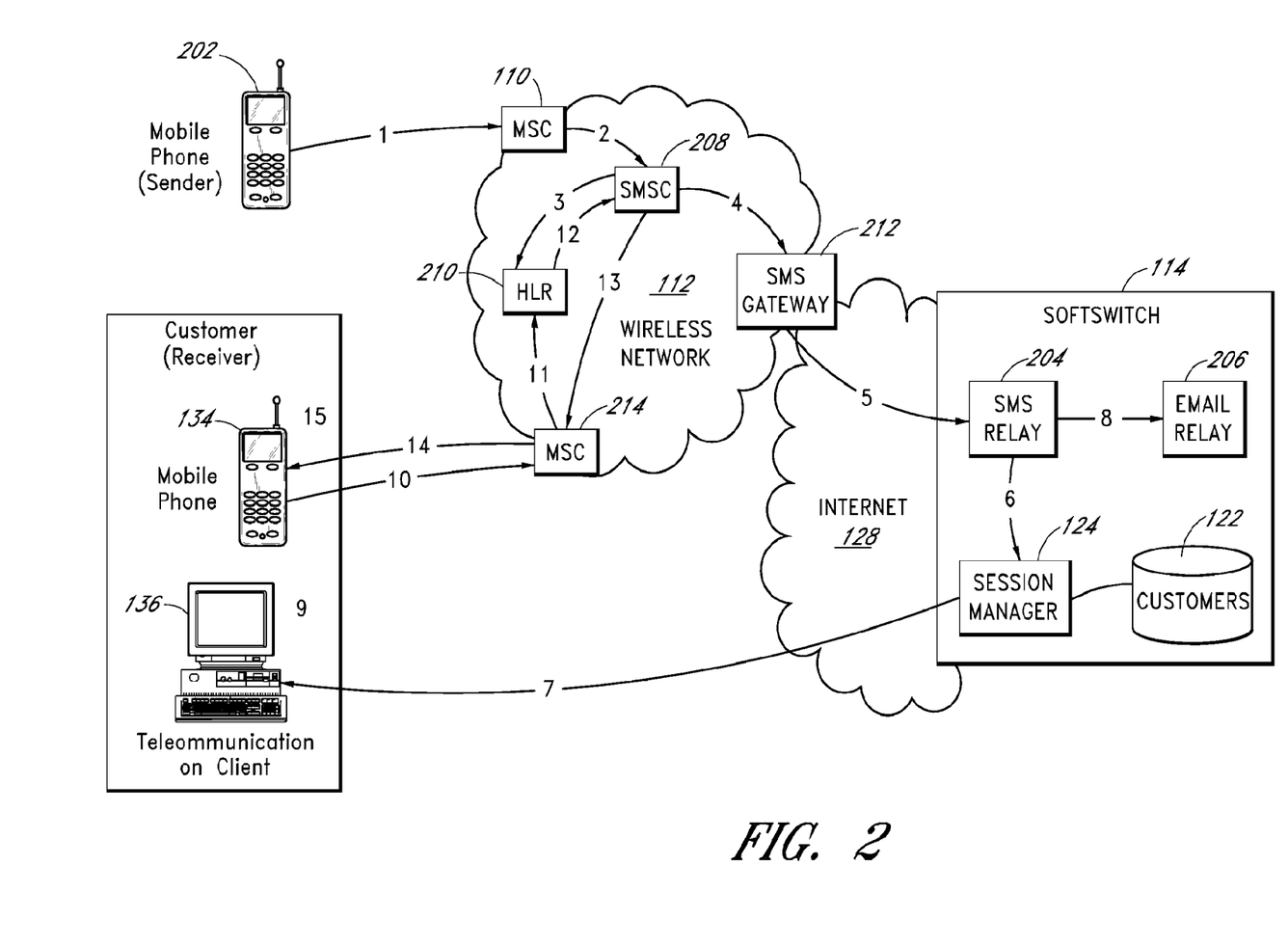
FIG. 2 illustrates a first example operating environment and example messaging service.

As illustrated in FIG. 2, the softswitch 114 call processing system optionally includes one or more other subsystems, such as some or all of the following: an SMS relay 204 subsystem, which receives inbound Short Message Service messages (also referred to herein as Short Messages) via an SMPP protocol for example; an email relay subsystem 208 which formats and sends email messages via SMTP, by way of example; a router subsystem, which serves as an interface to the Internet to manage communications between online IP client devices and one or more call processing servers, a web server subsystem to manage a website associated with the softswitch 114 (e.g., via which a user can access an account set-up/configuration user interface, a call log, a contacts database, etc., using a browser or other network user interface), etc. These foregoing subsystems are optionally interconnected via a Local Area Network (LAN), a Wide Area Private Network (WAN), and/or a Wide Area Public Network (e.g., Internet).

FIG. 2 depicts an example scenario in which a person uses their mobile phone to send a message, such as a Short Message (SM), to a designated recipient's mobile phone (although a different type of SMS-enable device can be a destination). However, designated recipient's mobile phone is unavailable (e.g., the designated recipient turned off the destination mobile phone upon coming home), and thus cannot receive the message. The SM is then forwarded to the designated recipient's telecommunications client (e.g., hosted on the designated recipient's personal computer or other host) per forwarding rules configured by the service provider or user (e.g., via an account set-up/members zone Web page, via a Web site of a corresponding carrier partner, or via a telecommunications client, wherein the rules or configuration is stored in a database, such as a customer account database) in the wireless network. In this example, the user specified that a notification regarding SMS messages (optionally including the message, sender name, and time of transmission and/or receipt) is to be transmitted to a specified email address. The example SM handling sequence scenario of FIG. 2 is now described in more detail:

State 1. The Sender, using mobile phone 202 (or other device capable of sending a Short Message), composes an SM and addresses it to the Designated recipient's mobile phone 134 (or other device capable of receiving Short Messages). The mobile phone 202 wirelessly transmits the SM. A Mobile Switching Center (MSC 214, which may be the same as MSC 110 illustrated in FIG. 1) (or other telephone exchange which provides circuit-switched calling, mobility management, communication services to mobile phones roaming within the area served by the exchange, such as voice, data, SMS, and/or call forwarding services), currently serving the Sender receives the SM.

State 2. The MSC 214 sends the SM to the home Short Message Service Center (SMSC 208).

State 3. The SMSC 208 queries the Home Location Register (HLR 210) for the location of the phone to which the SM is addressed. The HLR 210, in this example, indicates that the Designated recipient's mobile phone is not currently registered in the wireless provider's network and returns to the SMSC 208 the configured SM forwarding address.

State 4. In this example, the forwarding address is not one served by the SMSC 208, so the SMSC 208 makes a copy of the message, addresses it to the HLR 210 specified forwarding address, and sends it to the Inter-Carrier SMS gateway 212 used by that wireless carrier. The SMSC 208 also queues the SM for later wireless delivery to the Designated recipient's mobile phone 134.

State 5. The Inter-Carrier SMS gateway 212 recognizes the address in the received SM as being serviced by another carrier. The Inter-Carrier SMS gateway 212 creates a connection to the SMS relay 204 in the softswitch 114 of the carrier serving the Designated recipient and using a message transport protocol (e.g., Short Message Peer to Peer (SMPP) protocol) transfers the SM the SMS relay 204.

State 6. The SMS relay 204 within the softswitch 114 sends a notification message to the session manager 124 indicating that an SM has been received. The notification message includes the original destination address or other identifier associated therewith.

State 7. The session manager 124 verifies the address or other identifier is that of a customer (e.g., a subscriber of a service offered by the operator of the softswitch 114 and/or other entity having an account associated with the softswitch 114), optionally by determining if the address or other identifier matches or corresponds to a customer address or other identifier in the customer database 122 (which stores customer account records). The session manager 124 optionally notifies one or more telecommunication clients that are currently online (e.g., such as client 136) via a wired and/or wireless network associated with the customer of the new message. In this example, since the designated recipient also configured the service (e.g., via a web interface) to be notified of messages at a specified email address, the session manager 124 returns this email address to the SMS relay 204.

State 8. The SMS relay 204 transmits the SM message to the email relay 206 to send the SM to the Designated recipient's specified email address via a wired or wireless network. The SM text, other media and other attachment or link, if any, are included in the message.

Figure 5:
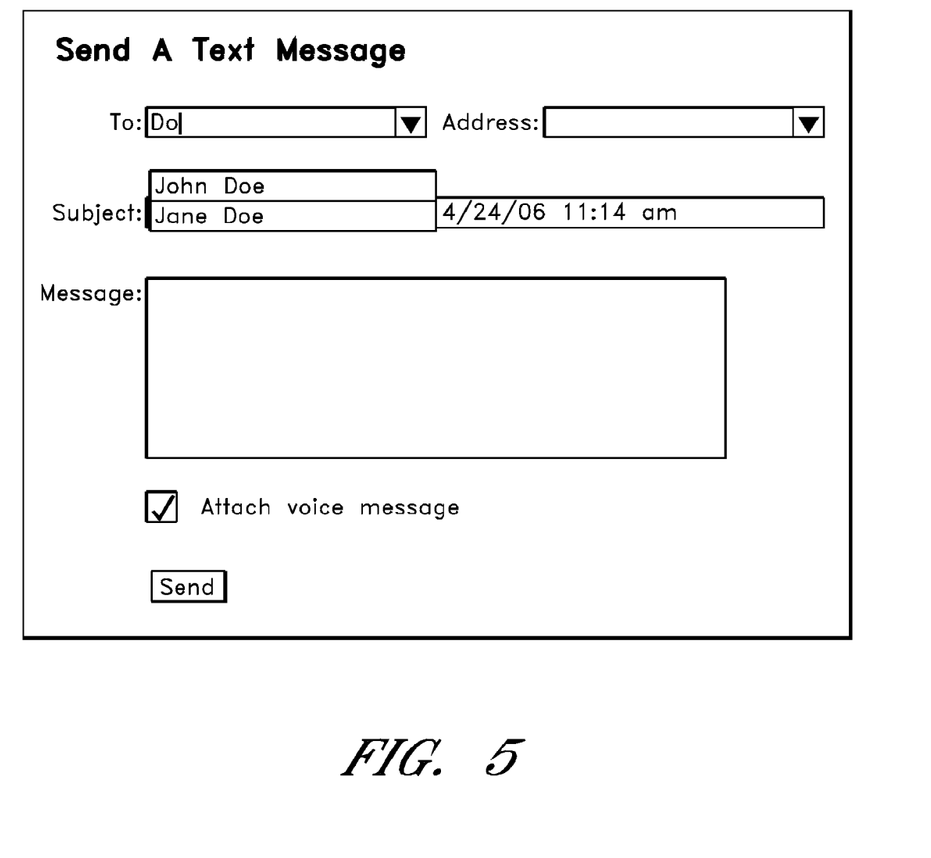
FIG. 5 illustrates an example user interface of a text message creation window.

State 9. In response to the session manger notification, the telecommunications client 136 alerts the designated recipient that a new message has been received via visual and/or audible notifications via the telecommunications client or browser user interface. The Designated recipient clicks on the message notification entry to have the client application 136 or browser user interface display the message (optionally the client can be configured to automatically display the message), reviews the message, and composes and sends a reply (e.g., using the example interface illustrated in FIG. 5). The reply follows the reverse path through the session manager 124, SMS Server, SMS gateway 212, SMSC 208, and MSC 214 back to the mobile phone 202 (or other sending device) of the original Sender. The Designated recipient's mobile phone address is optionally automatically used as the "from" address for the reply.

State 10. When the Designated recipient's mobile phone 134 is next turned on (e.g., the next morning), the mobile phone registers with the nearest MSC (e.g., MSC 214) if one is available.

State 11. The MSC 214 informs the HLR 210 of the registration (e.g., via a message transmitted from the MSC 214 to the HLR 210).

State 12. The HLR 210 informs the SMSC 208 via a message transmitted from the HLR 210 to the SMSC 208 of the registration since it knows there is an SM queued.

State 13. The SMSC 208 transmits the queued SM to the MSC 214.

State 14. The MSC 214 transmits a notification to the mobile phone 134 informing the mobile phone there is a message waiting. In response, the mobile phone display displays an icon and/or text indicating that there is an SM waiting.

State 15. The Designated recipient notices the message waiting icon and/or text via the mobile phone 134 and requests to view the SM (e.g., via a menu selection, by clicking on an entry corresponding to the SM, or otherwise). The Designated recipient deletes the message as it is an old message that was previously reviewed (e.g., via the telecommunications client or browser at state 9).

At state 4 above, optionally rather than sending the message to an Inter-Carrier Gateway, the SMSC 208 is configured to send a copy of the message directly to: a) a subscriber's forwarding address, b) to a message relay (e.g., in the softswitch 114), and/or c) one or more computer telecommunications clients over an IP connection. Other forwarding service implementations can be used as well.

At state 4 above, the HLR query by the SMSC 208 can be configured to generally or always return a forwarding address. Optionally, any Short Message directed to a designated recipient (or Short Message meeting certain criteria, such as being on a forwarding list or not being on a do not forward list) is mirrored to one or more telecommunication clients associated with the designated recipient and one or more email addresses, instant messaging addresses, or other addresses. Optionally, a message sync function is provided whereby deleting a message on one message store (e.g., a telecommunication client host), triggers or causes the deletion of queued messages at the SMSC 208.

The HLR 210 stores a forwarding address or equivalent identifier, similar to how the HLR 210 stores a call divert setting or forwarding phone number for missed calls. This forwarding address is optionally configured via the Web interface (e.g., via an account set-up/members zone Web page, via a Web site of a corresponding carrier partner, or via a telecommunications client), which in turn interfaces to the HLR 210 to perform the configuration edit. In addition or instead, the forwarding address is optionally configured by the user sending an SM to a specific designated phone number or destination. Other methods of configuring a forwarding address within the HLR 210 include but are not limited to having the service provider's call center or an Interactive Voice Response system.

The SMSC 208 is optionally also configured to receive and apply a forwarding address from the HLR 210 when the recipient of an SM is not registered for service with the HLR 210.

Optionally, in addition or instead, the SMS relay 204 is configured to notify the SMSC 208 if the SMS relay 204 has positive acknowledgement that the customer viewed the SM at the telecommunications client 136, and could therefore remove the message from the SMSC queue.

When a user (e.g., a customer that subscribes to or otherwise has the Short Message Forwarding service) modifies a forwarding address (e.g., via an account set-up/members zone Web page, via a Web site of a corresponding carrier partner, via a telecommunications client, or otherwise), the softswitch interfaces with the carrier partner's HLR (or entity storing the forwarding address parameter) to make the change. The interface with the Carrier Partner's HLR can be performed substantially immediately after the user specifies or modifies the forwarding address, at a scheduled time, or otherwise. An example forwarding address is in the form <phoneNumber>@domainname.tld (top level domain, such as .com, .net, .org, .edu, .gov, or other TLD) (e.g., 8055554100@callwave.com). The Inter-Carrier SMS Gateway or SMSC is preconfigured to route addresses of this format, and this domain in particular, to the carrier's softswitch that performs a message routing function. This interface offers the option of forwarding Short Messages to the forwarding address, regardless of whether the mobile phone itself is currently available to receive the message.

Figure 6:
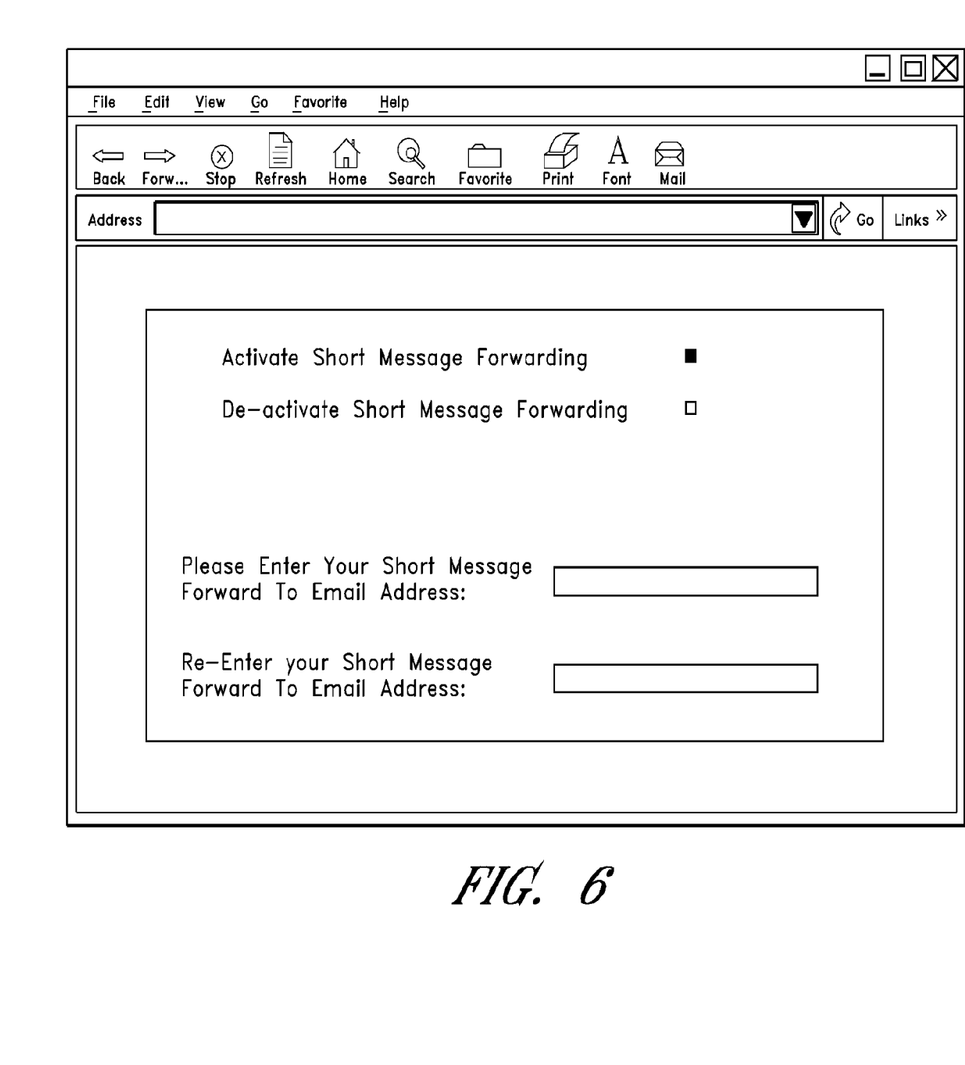
FIG. 6 illustrates an example user interface for configuring Short Message Forwarding service using a web browser.

FIG. 6 depicts an example web page used to configure the Short Message forwarding service address. A user can specify that Short Message forwarding is to be enabled or disabled via one or more corresponding fields or controls. The user can also enter into corresponding fields one or more forwarding addresses (e.g., forwarding email addresses). Other methods can be used to configure the Short Message forwarding service address, such as interactive voice response system or call center, by way of example and not limitation.

FIG. 3 illustrates another example user interface that displays a call log, wherein a call log entry optionally includes the date and time a call was received and if the caller's phone address is not private, the source of the call (e.g., an icon indicating whether the call was placed from the user's home, work, mobile, or fax phone address), the caller's phone address and/or name or other identifier. An entry can also indicate whether there is a recorded message left by the caller, and optionally the length (e.g., in seconds) of the message. Similarly, an entry can indicate whether a call is a fax call, and the length of the fax received (e.g., in pages).

A message, such as an SMS Short Message or an MMS message is optionally treated as another type of call or message by the telecommunications client. As illustrated in FIG. 3, the SM is optionally listed in the call log pane with other calls and messages. A Short Message log entry is optionally distinguished by an icon, coloring, and/or a label (e.g., 'SMS') in the details column of the log. The sender name (or other identifier), message length (e.g., in characters), and date/time the message was received can also be displayed.

New entries that have not yet been reviewed are optionally highlighted. A "new call" area displays the number of new calls the user has received. A contacts area displays at least a portion of a contact record for a contact (e.g., a contact corresponding to a selected log entry or otherwise selected).

By way of example, the contact record can include some or all of the following: contact name, address, phone address (es), email address(es), SMS address, company, title, name of ringback signal assigned to the contact, notes, and other information. An edit control is provided, which when activated, causes the contact record to be editable, wherein the edited contact record can then be saved into the contact database discussed herein. A "new" control is provided for creating a new contact record. A "click to add name" control is provided which, when activated, provides a user interface via which the user can add a name to a contact record that contains contact information, but not a contact name. Optionally, this user interface can display a speed dial assignment, as similarly discussed above.

When a Short Message entry in the log is selected, clicking on the play/view icon or double clicking on the selection optionally causes the Short Message to be displayed in the top pane of the telecommunications client.

Optionally, Delete, Reply, and Forward buttons or other controls are provided and displayed for responding to received Short Messages. Optionally, Reply and Forward requests result in a window being opened such as the example user interface illustrated in FIG. 5. Via the user interface, the user can enter into corresponding fields the name of a recipient (e.g., via a "to" field), an address, a subject, and a message. The user can also specify that a voice message is to be attached to the SM message. The user can record the voice message using a telecommunication client host microphone. Optionally, the user interface displays the current date. Optionally, a browse control is provided, which, when activated, enables the user to browse to or search for a desired file or link to attach or embed. Once the user locates the desired file or files, the user can select the file(s) or links thereto, which are then embedded or attached to the message. Optionally, a field is provided wherein the user can manually enter a desired file name and/or path. The user can optionally specify whether the file is to be embedded, attached, or linked. By way of example and not limitation, the files can include one or more of voice, fax, HTML, photos, video, music, program code, links, etc.

Figure 7A:
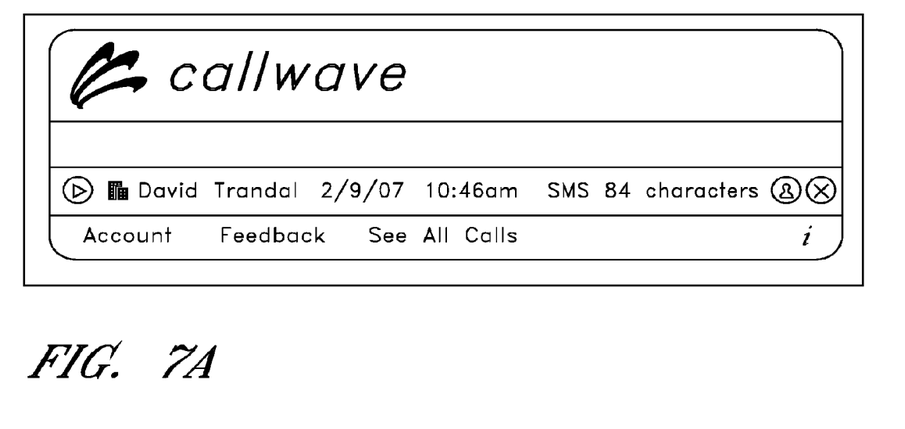
FIGS. 7A-B illustrate still another example user interface.

FIG. 7A illustrates an example widget user interface displaying call information for the most recent received call. The user interface includes some or all of the following: the name/identifier (if available) of the caller/sender, the date of the call/message, the time of the call/message, the connect time for the call, length of message left (if any), or length of fax received (if any). In the illustrated example, the user interface indicates that an SMS message including 47 characters was received. An expand control is provided to expand the size and/or amount of information displayed. An account control is provided, which when activated causes an account management Web page to be presented. A feedback control is provided which, when activated, causes a form to be presented via which the user can submit feedback to the system operator/provider (e.g., like and dislikes regarding the system and services, problem issues, etc.), access a help interface, and/or access answers to frequently asked questions. A "see all calls" control is provided, which when activated, causes the user interface to list numerous past calls (e.g., all past calls, all past call received in a certain time period whose entries have not been deleted, a certain number of past calls, etc.), optionally in a scrollable user interface.

Figure 7B:
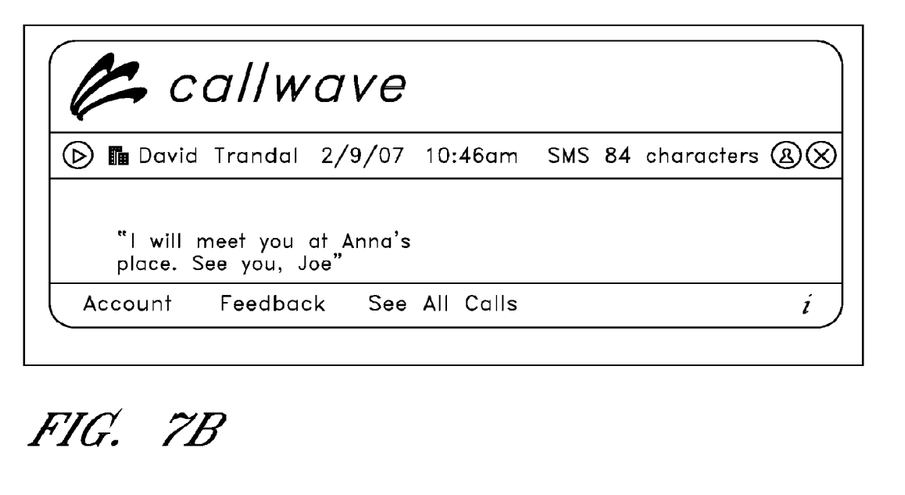

FIG. 7B illustrates an example expanded version of the user interface illustrated in FIG. 7A. The example view displays for an SMS message the calling number/SMS address and the message text (optionally in a scrollable window/area).

The Short Message Forwarding service can operate in the following example carrier environments wherein the carrier (e.g., the Carrier Partner):

Identifies which customers are to have the Short Message Forwarding service enabled and for each identify their mobile phone number.

Utilizes a wireless network where the HLR and SMSC support forwarding.

Enables a message routing capable softswitch to interface with the HLR and SMSC to configure forwarding addresses and to indicate whether to forward all Short Messages or only those received when the given mobile phone is not available to receive the message.

Configures the Inter-Carrier SMS Gateway or SMSC to route all Short Messages with addresses of the form <phoneNumber>@domainname.TLD to the forwarding address or to a softswitch that can route the messages to their destination addresses.

Thus, example methods and systems are described that can be utilized wirelessly forward a message (e.g., an SMS or MMS message) to a destination other than the addressed destination (e.g., when the addressed destination, such as a mobile phone, is not available) and to forward or broadcast a message (e.g., an SMS or MMS message) to a plurality of destinations, even if the message is addressed to a single destination. Certain example embodiments described store a message intended for an unavailable destination, such as a mobile phone, and when the destination becomes available, transmits the stored message to the destination.

It should be understood that certain variations and modifications of this invention would suggest themselves to one of ordinary skill in the art. The scope of the present invention is not to be limited by the illustrations or the foregoing descriptions thereof.

What is claimed is:

1. A method of managing Short Messaging Service messages, the method comprising:

receiving at an SMS relay a first SMS message originated from a first device and directed to a first destination address associated with a device of a user;

storing the first SMS message on a server accessible over a network by the user;

enabling the user to access a user interface via which the user can view the stored first SMS message from the networked server and (a) delete the first SMS message from a log of SMS messages, or (b) forward the first SMS message stored on the networked server, or (c) reply to the first SMS message stored on the networked server, or (d) edit an originating address associated with the first SMS message stored on the networked server, or (e) create a contact record including at least the originating address associated with the first SMS message stored on the networked server, or (f) originate a call to the first device that originated the first SMS message stored on the networked server, or any combination of (a), (b), (c), (d), (e) and (f);

receiving at the SMS relay a second SMS message originated from a second device and directed to the first destination address;

querying a Home Location Register (HLR) regarding a status of the user device associated with the first destination address;

receiving an indication from the HLR as to whether the user device associated with the first destination address is available to receive the second SMS message;

storing the second SMS message on the server, wherein the server is accessible over the network by the user;

wherein, via the user interface, the user can view the stored second SMS message from the networked server and (g) delete the second SMS message, from the log of SMS messages or (h) forward the second SMS message stored on the networked server, or (i) reply to the second SMS message stored on the networked server, or (j) edit an originating address associated with the second SMS message stored on the networked server, or (k) create a contact record including an originating address of the second SMS message stored on the networked server, or (l) originate a call to the second device that originated the second SMS message stored on the networked server, or any combination of (g), (h), (i), (j), (k) and (l); and at least partly in response to the indication from the HLR that the device of the user is not available to receive the second SMS message, causing at least in part a message notification to be transmitted to the user, wherein the notification is transmitted to a second destination address, wherein the second destination address is different than the first destination address.

2. The method as defined in claim 1, wherein the second SMS message is a plurality of SMS messages.

3. The method as defined in claim 1, the method further comprising receiving a reply message to the first SMS message from the user via the user interface, and at least partly causing the reply message to be transmitted to the first device that originated the first SMS message.

4. The method as defined in claim 1, wherein the second SMS message is stored in a queue to be delivered at a later time to the first destination address, and at least partly in response to a deletion instruction being provided via the user interface, causing the second SMS message to be removed from the queue so that the second SMS message is not transmitted to the first destination address.

5. The method as defined in claim 1, the method further comprising providing an interface via which the user can provide a message notification destination address.

6. The method as defined in claim 5, wherein the message notification destination address is an email address.

7. The method as defined in claim 1, wherein the second SMS message includes a photograph.

8. A method of managing Short Messaging Service messages, the method comprising:

receiving a first SMS message at a message processing system directed to a first destination associated with a user;

storing the first SMS message on a server accessible over a network by the user;

enabling the user to access a user interface via which the user can view the stored first SMS message from the networked server and (a) delete the first SMS message from a server log of SMS messages, or (b) forward the first SMS message stored on the networked server, or (c) reply to the first SMS message stored on the networked server, or (d) edit an originating address associated with the first SMS message stored on the networked server, or (e) create a contact record including at least the originating address associated with the first SMS message stored on the networked server, or (f) originate a call to the first device that originated the first SMS message stored on the networked server, or any combination of (a), (b), (c), (d), (e) and (f);

receiving at the message processing system a second SMS message originated from a second device and directed to the first destination address;

querying a device availability system regarding a status of the user device associated with the first destination address;

receiving an indication from the device availability system as to whether the user device associated with the first destination address is available to receive the second SMS messages;

storing the second SMS message on the server, wherein the server is accessible over the network by the user; and at least partly in response to the indication from the device availability system that the device of the user is not available to receive SMS messages, causing at least in part a message notification to be transmitted to the user wherein the notification is transmitted to a second destination address, wherein the second destination address is different than the first destination address.

9. The method as defined in claim 8, wherein the second SMS message is a plurality of SMS messages.

10. The method as defined in claim 8, the method further comprising receiving a reply message to the first SMS message from the user via the user interface, and at least partly causing the reply message to be transmitted to the first device that originated the first SMS message.

11. The method as defined in claim 8, wherein the second SMS message is stored in a queue to be delivered at a later time to the first destination address, and at least partly in response to a deletion instruction being provided via the user interface, causing the second SMS message to be removed from the queue so that the second SMS message is not transmitted to the first destination address.

12. The method as defined in claim 8, the method further comprising providing an interface via which the user can provide the second destination address.

13. The method as defined in claim 12, wherein the second destination address is an email address.

14. The method as defined in claim 13, wherein the second SMS message includes a photograph.

15. An apparatus configured to manage Short Messaging Service messages, the apparatus comprising:
a computing system including one or more processing devices;
instructions stored in non-transitory computer readable memory that, when executed, cause the computing system to perform operations comprising:
receiving a first SMS message at a message processing system directed to a first destination associated with a user;
storing the first SMS message on a server accessible over a network by the user;
enabling the user to access a user interface via which the user can view the stored first SMS message from the networked server and (a) delete the first SMS message from a server log of SMS messages, or (b) forward the first SMS message stored on the networked server, or (c) reply to the first SMS message stored on the networked server, or (d) edit an originating address associated with the first SMS message stored on the networked server, or (e) create a contact record including at least the originating address associated with the first SMS message stored on the networked server, or (f) originate a call to the first device that originated the first SMS message stored on the networked server, or any combination of (a), (b), (c), (d), (e) and (f);

receiving at the message processing system a second SMS message originated from a second device and directed to the first destination address;

querying a device availability system regarding a status of the user device associated with the first destination address;

receiving an indication from the device availability system as to whether the user device associated with the first destination address is available to receive the second SMS messages;

storing the second SMS message on the server, wherein the server is accessible over the network by the user; and at least partly in response to the indication from the device availability system that the device of the user is not available to receive SMS messages, causing at least in part a message notification to be transmitted to the user wherein the notification is transmitted to a second destination address, wherein the second destination address is different than the first destination address.

16. The apparatus as defined in claim 15, wherein the second SMS message is a plurality of SMS messages.

17. The apparatus as defined in claim 15, the operations further comprising receiving a reply message to the first SMS message from the user via the user interface, and at least partly causing the reply message to be transmitted to the first device that originated the first SMS message.

18. The apparatus as defined in claim 15, wherein the second SMS message is stored in a queue to be delivered at a later time to the first destination address, wherein the operations further comprise: at least partly in response to a deletion instruction being provided via the user interface, causing the second SMS message to be removed from the queue so that the second SMS message is not transmitted to the first destination address.

19. The apparatus as defined in claim 15, the operations further comprising providing the user interface via which the user can provide the second destination address.

20. The apparatus as defined in claim 19, wherein the second destination address is an email address.

21. The apparatus as defined in claim 15, wherein the second SMS message includes a photograph.

* * * * *